United States Patent
Yeh et al.

(10) Patent No.: US 8,203,835 B2
(45) Date of Patent: Jun. 19, 2012

(54) MOUNTING MECHANISM FOR STORAGE DEVICE

(75) Inventors: Chin-Wen Yeh, Taipei Hsien (TW); Zhi-Jian Peng, Shenzhen (CN); Chen-Liang Geng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 318 days.

(21) Appl. No.: 12/481,049

(22) Filed: Jun. 9, 2009

(65) Prior Publication Data

US 2010/0163699 A1    Jul. 1, 2010

(30) Foreign Application Priority Data

Dec. 31, 2008    (CN) ...................... 2008 2 0303945 U

(51) Int. Cl.
- *G06F 1/16* (2006.01)
- *H05K 5/00* (2006.01)
- *H05K 7/00* (2006.01)

(52) U.S. Cl. ................... 361/679.33; 248/694; 248/918; 248/222.51; 248/220.21; 248/220.22; 312/223.2; 361/679.02; 361/679.31

(58) Field of Classification Search .................. 248/918, 248/694, 200, 205.1, 222.51, 220.21, 220.22; 361/679.02, 679.31, 679.33; 312/223.2
See application file for complete search history.

(56) References Cited

U.S. PATENT DOCUMENTS

| | | | |
|---|---|---|---|
| 6,530,551 B2* | 3/2003 | Gan ............................. 248/694 |
| 6,711,011 B2* | 3/2004 | Lee .............................. 361/679.6 |
| 7,012,804 B2* | 3/2006 | Yokote et al. .............. 361/679.33 |
| 7,200,001 B2* | 4/2007 | Spychalla .................. 361/679.33 |
| 7,204,469 B2* | 4/2007 | Chen et al. ..................... 248/694 |
| 7,206,197 B2* | 4/2007 | Chen et al. ............... 361/679.02 |
| 7,355,846 B1* | 4/2008 | Chen et al. ............... 361/679.33 |
| 7,365,971 B2* | 4/2008 | Chen et al. ............... 361/679.33 |
| 7,375,922 B2* | 5/2008 | Chen et al. ................. 360/97.02 |
| 7,495,925 B2* | 2/2009 | Chen et al. ..................... 361/726 |
| 7,576,984 B2* | 8/2009 | Chen et al. ............... 361/679.33 |
| 7,639,506 B2* | 12/2009 | Chen et al. ..................... 361/747 |
| 7,697,276 B2* | 4/2010 | Peng et al. ............... 361/679.33 |
| 7,808,778 B2* | 10/2010 | Hsu ........................... 361/679.38 |
| 7,848,098 B2* | 12/2010 | Huang ...................... 361/679.33 |
| 7,922,144 B2* | 4/2011 | Lee .............................. 248/694 |
| 2005/0185373 A1* | 8/2005 | Chen et al. ..................... 361/685 |
| 2006/0007650 A1* | 1/2006 | Shim ............................. 361/685 |
| 2006/0126288 A1* | 6/2006 | Chen et al. ..................... 361/685 |
| 2007/0008693 A1* | 1/2007 | Yeh et al. ....................... 361/685 |
| 2007/0263351 A1* | 11/2007 | Ho et al. ........................ 361/685 |
| 2007/0268661 A1* | 11/2007 | Wobig et al. .................. 361/685 |

FOREIGN PATENT DOCUMENTS

CN    101634881 A  *  1/2010

* cited by examiner

*Primary Examiner* — Terrell McKinnon
*Assistant Examiner* — Michael McDuffie
(74) *Attorney, Agent, or Firm* — Altis Law Group, Inc.

(57) ABSTRACT

A mounting mechanism for a storage device includes a bracket for receiving the storage device therein, and a pressing member. The bracket includes a sidewall defining at least one opening, and a bottom wall defining at least one guiding member for guiding and supporting a bottom surface of the storage device. A supporting member is located below the opening to resist the bottom surface of the storage device. The pressing member attached to the sidewall of the bracket for sandwiching the storage device between a bottom surface of the pressing member and the bracket.

15 Claims, 4 Drawing Sheets

MOUNTING MECHANISM FOR STORAGE DEVICE

BACKGROUND

1. Technical Field

The present disclosure relates to a mounting mechanism, and particularly, to a mounting mechanism which facilitates attachment of a storage device to a computer chassis.

2. Description of Related Art

Computers have been widely used in modern life. It is desirable for a user or technician to conveniently access internal components such as storage devices, expansion cards and motherboard for purpose of service or replacement. However, storage devices, such as hard disk drives, compact disk read-only memory (CD-ROM) drives, digital video disc (DVD) drives, floppy disk drives, and the like are typically secured in computer chassis with screws or bolts. It is complicated and time-consuming to operate threaded elements.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
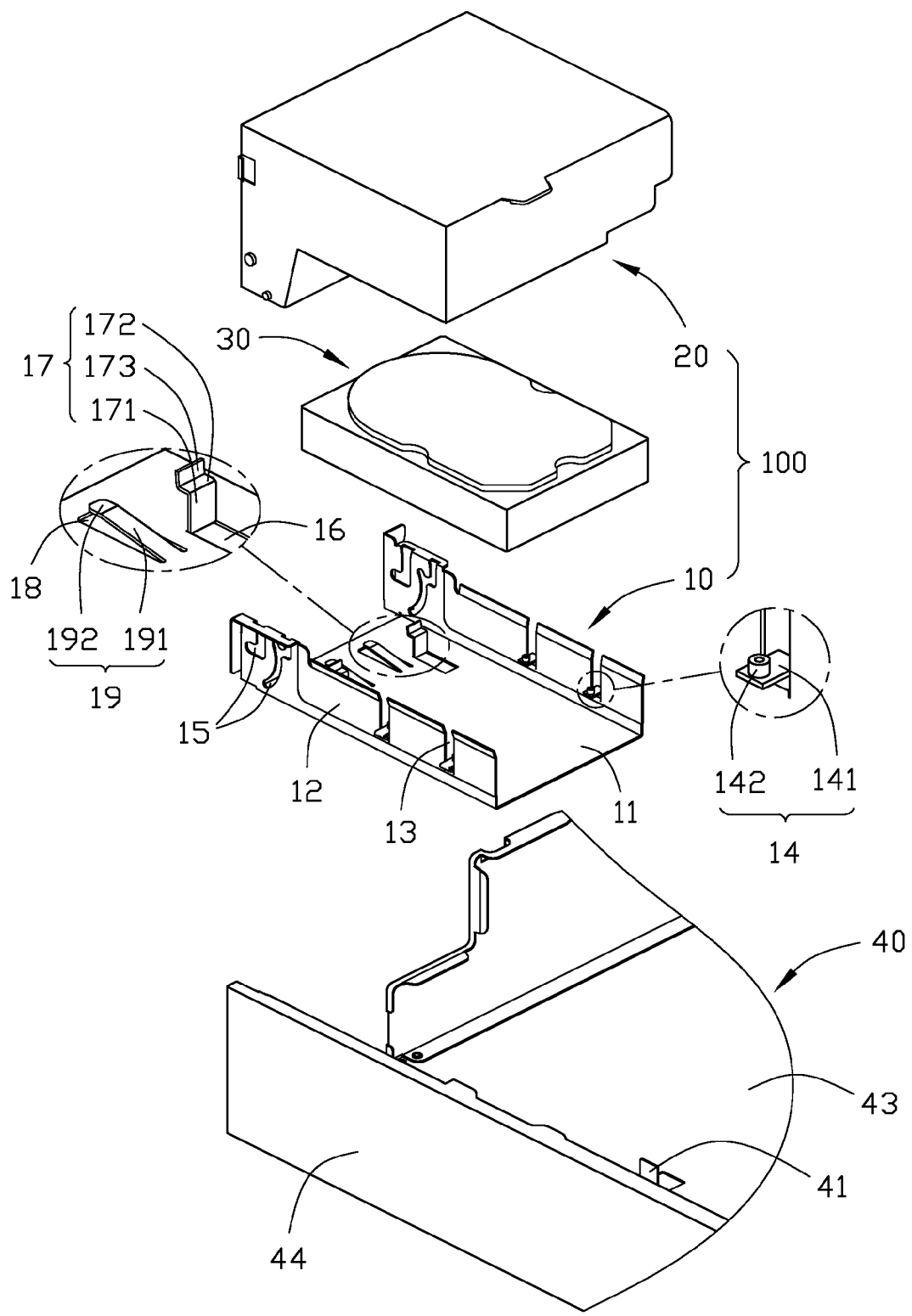
FIG. 1 is an exploded, isometric view of an embodiment of a mounting mechanism together with a storage device, the mounting mechanism comprising a computer chassis, a bracket, and a pressing member.
Figure 2:
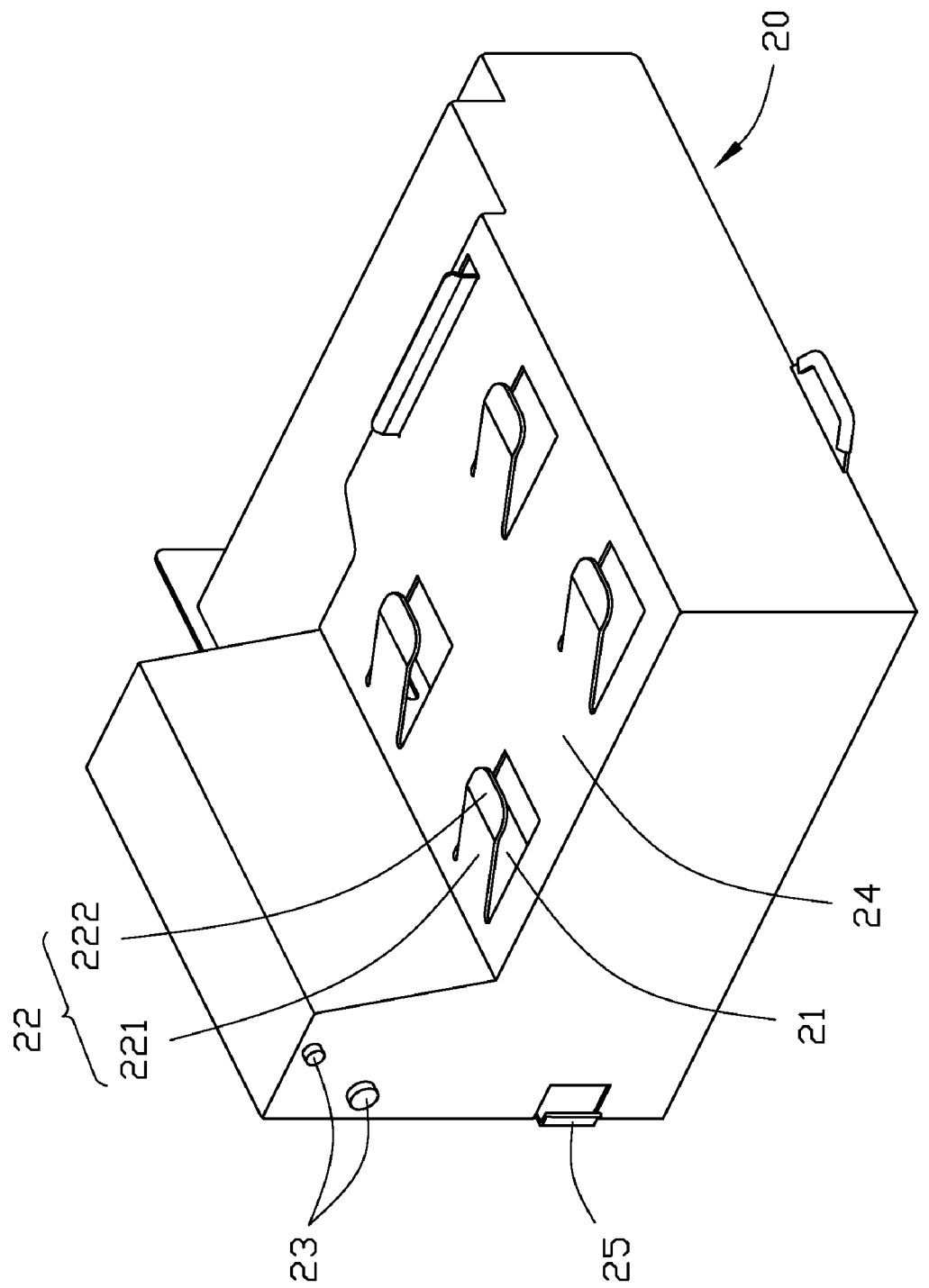
FIG. 2 is an isometric view of the pressing member shown in FIG. 1, but viewed from another aspect.

Referring to FIGS. 1 and 2, an embodiment of a mounting mechanism 100 is provided for holding a storage device 30 in a computer chassis 40. The mounting mechanism 100 comprises a bracket 10 attached to the computer chassis 40, and a pressing member 20. In the present embodiment, the pressing member 20 is a power supply.

The bracket 10 comprises a bottom wall 11, and a pair of sidewalls 12 extended perpendicularly from two side edges of the bottom wall 11. A plurality of slots 18 are defined in the bottom wall, and a plurality of biasing members 19 extends from edges of the slots 18 correspondingly. Each biasing member 19 includes an elastic element 191 that extends from an edge of the corresponding slot 18, and a horizontal member 192 that extends horizontally from a distal end of the elastic element 191. A plurality of slots 16 are defined in the bottom wall 11, and a plurality of guiding members 17 extend from edges of the corresponding slots 16. Each guiding member 17 includes an upright arm 171 extending from a side edge of the slot 16. A supporting arm 172 extends horizontally from a top edge of the upright arm 171. A guiding arm 173 extends perpendicularly from an end portion of the supporting arm 172. Each sidewall 12 defines a plurality of openings 13, and forms a plurality of supporting members 14 located below the corresponding openings 13. Each supporting member 14 includes an elastic portion 141 extending from a bottom edge of the opening, and a supporting protrusion 142 formed on the elastic portion 141. A plurality of fixing slots 15 are formed at a back portion of each sidewall 12 away from the openings 13.

Referring to FIG. 2, the pressing member 20 includes a plurality of slots 21 and a plurality of flexing members 22 extending from the slots 21 on a bottom surface 24 of the pressing member 20. Each flexing member 22 includes a flexible element 221 that extends from the corresponding slot 21, and an extension member 222 that horizontally extends from an edge of the flexible element 221. A plurality of fixing protrusions 23 are formed at a back portion of two sides of the pressing member 20 configured for engaging with the pluralities of fixing slots 15 of the bracket 10. A fixing tab 25 is formed at the back portion of one side of the pressing member 20 below the fixing protrusions 23.

Figure 3:
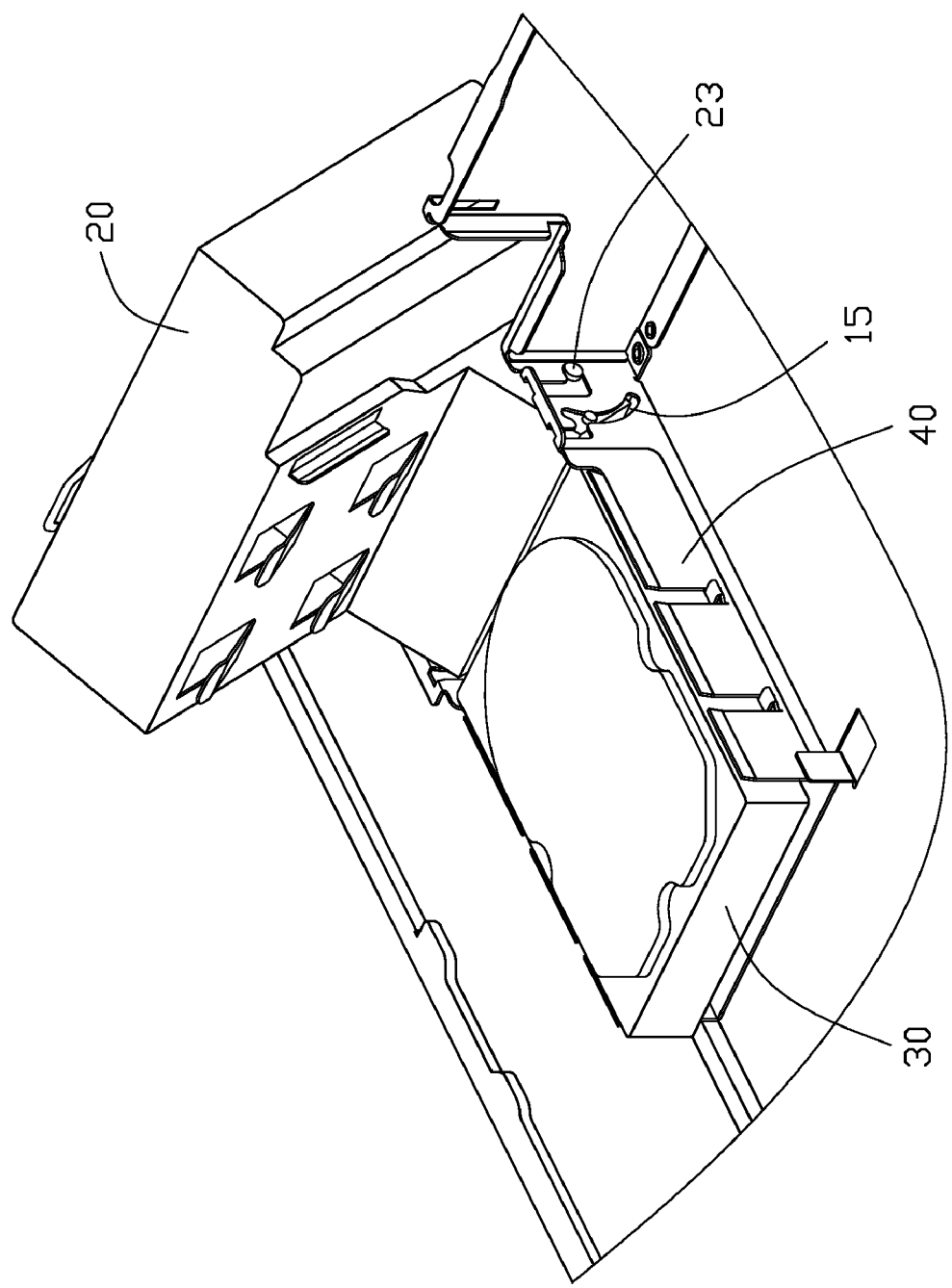
FIG. 3 is an assembled view of FIG. 1, showing the pressing member engaged with the bracket.
Figure 4:
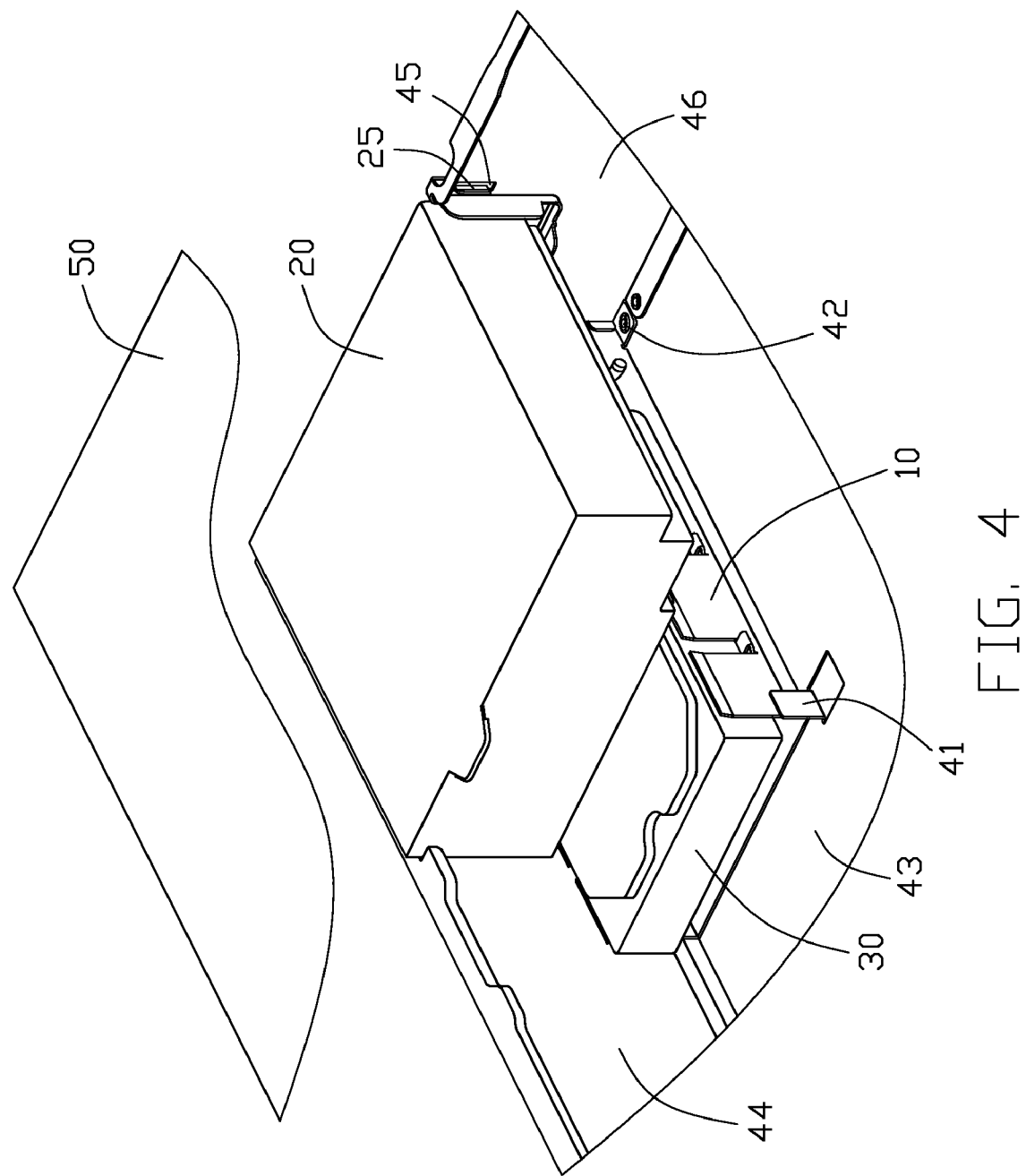
FIG. 4 is an assembled view of FIG. 1, showing the storage device fully attached to the bracket.

A plurality of securing holes (not shown) is formed on a bottom surface of the storage device 30 to engage with the supporting protrusions 142. A diameter of the securing holes (not shown) on the bottom surface of the storage device 30 is substantially equal to a diameter of the supporting protrusions 142. A locating member 41 and a locking member 42 are formed on a bottom wall 43 of the chassis 40. A locating hole 45 is formed at a back wall 46 of the chassis 40 configured for engaging with the fixing tab 25 of the pressing member 20. Referring to FIGS. 1 and 3~4, in assembly, a back portion of the bracket 10 is secured in the locking member 42 of the bottom wall 43. The bracket 10 is located between the locating member 41 and a side wall 44 of the chassis 40. The storage device 30 is moved toward the bracket 10 until the supporting protrusions 142 are received in the corresponding securing holes (not shown). The fixing protrusions 23 of the pressing member 20 are slid into the corresponding fixing slots 15. And the fixing tab 25 of the pressing member 20 is secured in the locating hole 45. Then, a cover plate 50 of the computer chassis 40 can be fixed on the computer chassis 40, and the cover plate 50 elastically resists the pressing member 20. The biasing members 19, the flexing members 22, and the supporting members 14 are elastic pieces for shock absorption. The storage device 30 is protected from damage when the computer chassis 40 is moved or transported. The mounting mechanism 100 attaches the storage device 30 to the computer chassis 40 by the supporting members 14, the biasing members 19, and the flexing members 22 on the bracket 10 and the pressing member 20. It is easy and convenient to fix the storage device 30 onto the bracket 10, and the screws are not needed.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting mechanism for a storage device, comprising:
   a bracket for receiving the storage device therein, the bracket comprising a sidewall defining at least one opening, and a bottom wall defining at least one guiding member, a supporting member being located below the opening to resist the bottom surface of the storage device;
   a pressing member attached to the sidewall of the bracket for sandwiching the storage device between the pressing member and the bracket; wherein the supporting member comprises an elastic portion extended from the opening, and a supporting protrusion formed on the elastic portion; the supporting protrusion is adapted to be received in a securing hole on the bottom surface of the storage device; and the elastic portion is elastically deformed to support the storage device; a plurality of fixing slots are formed at a back portion of the sidewall, the pressing member comprises a plurality of fixing protrusions defined on a back portion of the pressing member that engages the plurality of fixing slots; a fixing tab is formed at the back portion of one side of the pressing member below the fixing protrusions; and a computer chassis comprising a bottom wall defining a locating member and a locking member, a back wall defining a locating hole for engaging with the fixing tab, and a side wall, a back portion of the bracket is secured in the locking member of the bottom wall, and the bracket is located between the locking member and the side wall of the computer chassis.

2. The mounting mechanism of claim 1, wherein a plurality of fixing slots are formed at a back portion of the sidewall, the pressing member comprises a plurality of fixing protrusions that engage the plurality of fixing slots.

3. The mounting mechanism of claim 1, wherein the bottom wall defines at least a first slot thereon, the guiding member comprises an upright arm extended from an edge of the slot, a supporting arm extends horizontally from a top edge of the upright arm, and a guiding arm extends perpendicularly from the supporting arm.

4. The mounting mechanism of claim 1, wherein a diameter of the supporting protrusion is substantially equal to a diameter of the securing hole.

5. The mounting mechanism of claim 3, wherein the bottom wall further defines a second slot thereon, and a biasing member extended from the second slot, the biasing member comprises an elastic element extended slantwise from the second slot, and a horizontal member formed at an end portion of the elastic element.

6. The mounting mechanism of claim 1, wherein the pressing member is a power supply.

7. The mounting mechanism of claim 1, wherein the pressing member comprises a plurality of slots and a plurality of flexing members extended from the slots on the bottom surface of the pressing member.

8. The mounting mechanism of claim 7, wherein each flexing member comprises a flexible element extended at an angle from the corresponding slot, and an extension member formed at an end portion of each flexible element.

9. The mounting mechanism of claim 7, wherein the supporting member is integrally formed with the sidewall of the bracket, and the flexing members are integrally formed with the bottom surface of the pressing member.

10. A mounting mechanism for a storage device, comprising:
a computer chassis;
a bracket for receiving the storage device therein, the bracket comprising a sidewall defining at least one opening, and a bottom wall defining at least one guiding member for guiding and supporting a bottom surface of the storage device, a supporting member located below the opening to resist the bottom surface of the storage device;
a pressing member attached to the sidewall of the bracket for sandwiching the storage device between a bottom surface of the pressing member and the bracket, a cover plate of the chassis engages the pressing member; wherein a plurality of fixing slots are formed at a back portion of the sidewall, the pressing member comprises a plurality of fixing protrusions defined on a back portion of the pressing member that engages the pluralities of fixing slots; a fixing tab is formed at the back portion of one side of the pressing member below the fixing protrusions; the computer chassis comprises a bottom wall defining a locating member and a locking member, a back wall defining a locating hole for engaging with the fixing tab, and a side wall, a back portion of the bracket is secured in the locking member of the bottom wall, the bracket is located between the locking member and the side wall of the computer chassis.

11. The mounting mechanism of claim 10, wherein the slots are arcuate.

12. The mounting mechanism of claim 10, wherein the bottom wall defines at least a first slot, the guiding member comprises an upright arm extended from a side edge of the slot, a supporting arm extends horizontally from a top edge of the upright arm, a guiding arm extends perpendicularly from an end portion of the supporting arm.

13. The mounting mechanism of claim 10, wherein the supporting member comprises an elastic portion extended from a bottom edge of the opening, and a supporting protrusion defined on the elastic portion, the storage device defines at least one securing hole on the bottom surface to engage the supporting protrusion, a diameter of the supporting protrusion is substantially equal to a diameter of the securing hole, the supporting protrusion is inserted in the securing hole to fix the storage device on the bracket.

14. The mounting mechanism of claim 10, wherein the pressing member comprises a plurality of slots and a plurality of flexing members extended from the slots.

15. The mounting mechanism of claim 14, wherein each flexing member comprises a flexible element, and an extension member formed at an end portion of each flexible element.

* * * * *